United States Patent
Doebbelin et al.

(10) Patent No.: US 10,040,451 B2
(45) Date of Patent: Aug. 7, 2018

(54) VEHICLE WARNING DEVICE FOR EMITTING A WARNING SIGNAL

(71) Applicant: s.m.s smart microwave sensors GmbH, Braunschweig (DE)

(72) Inventors: Stefan Doebbelin, Wedemark (DE); Ralph Mende, Braunschweig (DE)

(73) Assignee: S.M.S. SMART MICROWAVE SENSORS GMBH, Braunschweig (DE)

( * ) Notice: Subject to any disclaimer, the term of this patent is extended or adjusted under 35 U.S.C. 154(b) by 0 days.

(21) Appl. No.: 15/329,637

(22) PCT Filed: Jul. 28, 2015

(86) PCT No.: PCT/EP2015/001547
§ 371 (c)(1),
(2) Date: Jan. 27, 2017

(87) PCT Pub. No.: WO2016/015856
PCT Pub. Date: Feb. 4, 2016

(65) Prior Publication Data
US 2017/0210384 A1    Jul. 27, 2017

(30) Foreign Application Priority Data
Jul. 28, 2014   (DE) .................. 10 2014 010 936

(51) Int. Cl.
*B60Q 1/00*       (2006.01)
*B60W 30/095*    (2012.01)
(Continued)

(52) U.S. Cl.
CPC ......... *B60W 30/0953* (2013.01); *B60Q 1/503* (2013.01); *B60Q 1/525* (2013.01);
(Continued)

(58) Field of Classification Search
CPC ......... B60W 30/0953; B60W 30/0956; B60W 40/10; B60W 50/0097; B60Q 1/525
USPC ......................................... 340/435
See application file for complete search history.

(56) References Cited

U.S. PATENT DOCUMENTS 5,357,798 A  *  10/1994  Weinzerl ............ B60T 8/17551
                                                          701/1
2005/0187701 A1 *  8/2005  Baney .............. G08G 1/096716
                                                          701/117
(Continued)

FOREIGN PATENT DOCUMENTS

DE        42 00 997 A1      7/1993
DE     1993 33 782 A1      1/2001
(Continued)

*Primary Examiner* — Omer S Khan
(74) *Attorney, Agent, or Firm* — W&C IP

(57) ABSTRACT

The invention relates to a device (8) to be arranged on a motor vehicle (2). Said device (8) comprises a speedometer (4) for ascertaining a relative speed between an object and a device (8), at least one warning mechanism (6) for emitting a warning signal in the direction of the object, find an electric controller which is designed to emit a warning signal via the at least one warning mechanism (6) when the ascertained relative speed exceeds a predefined threshold value.

13 Claims, 1 Drawing Sheet

(51) Int. Cl.
  *B60W 50/00* (2006.01)
  *B60Q 1/52* (2006.01)
  *B60W 40/10* (2012.01)
  *B60Q 1/50* (2006.01)
  *B60Q 5/00* (2006.01)

(52) U.S. Cl.
  CPC ......... *B60Q 5/006* (2013.01); *B60W 30/0956* (2013.01); *B60W 40/10* (2013.01); *B60W 50/0097* (2013.01); *B60W 2520/10* (2013.01); *B60W 2520/125* (2013.01); *B60W 2550/10* (2013.01); *B60W 2550/12* (2013.01); *B60W 2550/30* (2013.01); *B60W 2550/308* (2013.01)

(56) References Cited

U.S. PATENT DOCUMENTS

2006/0070787 A1* 4/2006 Bartels ................. G01S 13/931
                                                          180/271
2008/0136702 A1* 6/2008 Tsuchihashi ............ G01S 13/34
                                                          342/27
2009/0134987 A1* 5/2009 Oltmann ................ B60Q 1/302
                                                          340/435
2009/0256698 A1* 10/2009 Bonilla .................... B60Q 1/44
                                                          340/479
2012/0041632 A1* 2/2012 Garcia Bordes .. B60W 30/0953
                                                          701/29.1

FOREIGN PATENT DOCUMENTS

| DE | 10 240 018 A1 | 3/2004 | |
| DE | 10 2005 003 354 A1 | 8/2006 | |
| DE | 10 2005 013335 A1 | 10/2006 | |
| DE | 102005013335 A1 * | 10/2006 | ............ B60Q 1/525 |
| DE | 10 2005 059 688 A1 | 6/2007 | |
| DE | 10 2011 107 271 A1 | 1/2013 | |
| DE | 10 2012 214 979 A1 | 2/2014 | |
| FR | 2 995 269 A1 | 3/2014 | |
| WO | 2007/068459 A1 | 6/2007 | |

* cited by examiner

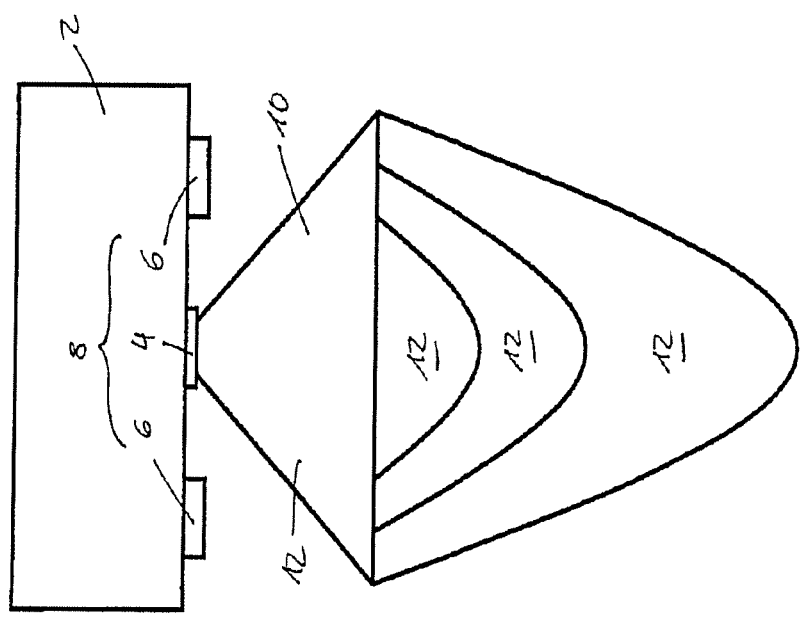

VEHICLE WARNING DEVICE FOR EMITTING A WARNING SIGNAL

The invention relates to an apparatus to be arranged on a motor vehicle.

Apparatuses which may be arranged on motor vehicles as additional equipment have been known for a long time in the prior art. They may be used for esthetical reasons and be positioned on the motor vehicle, or facilitate additional functions which were not integrated into the motor vehicle on the part of the producer.

Rear-end collisions, which often lead to death or injury in addition to frequent significant damage, occur in road traffic, in particular on busy traffic routes, for example highways. Trucks are often involved in these accidents since these, on account of the large mass thereof, may cause great damage in the case of accidents with substantially smaller automobiles and since said trucks have practically no crumpling zone protecting the driver in the case of rear-end collisions with other trucks. The invention is therefore based on the problem of proposing an apparatus to be arranged on a motor vehicle, by means of which the traffic safety in road traffic may be increased, said apparatus being fastenable on the motor vehicle with little outlay.

The invention solves the addressed problem by an apparatus to be arranged on a motor vehicle, said apparatus comprising a velocity-measuring device for determining magnitude and direction of a relative velocity between an object and the apparatus, a warning device for emitting a warning signal in the direction of the object, and an electric controller, wherein the electric controller is configured to check, at least by means of a determined magnitude and direction of a relative velocity as well, whether a predetermined warning criterion is satisfied and to emit a warning signal in this case by way of the warning device.

The apparatus is advantageously arranged at the rear end of a motor vehicle, for example of a truck, and determines the relative velocity between an object and the apparatus by way of the velocity-measuring device. Advantageously, the object is a motor vehicle following the motor vehicle on which the apparatus is arranged. If the relative velocity between the apparatus, and hence the vehicle on which the apparatus is arranged, and the following vehicles determined thus exceeds a predetermined threshold, this is a criterion for a warning signal to be emitted. Said warning signal is emitted by way of the warning device in the direction of the object, i.e. in the present case in the direction of the following vehicle which is approaching too quickly, and so the driver of the following vehicle receives the warning signal and is able to adapt, in particular reduce, his relative velocity in relation to the vehicle on which the apparatus is arranged. This all occurs without the need for providing information in this respect to the driver of the vehicle on which the apparatus is arranged. In particular, said driver is not startled by warning signals or alarm signals and/or is not unduly influenced in terms of his concentration but can instead continue to direct his whole concentration and attentiveness to the traffic lying ahead of him.

It is particularly simple to arrange the apparatus on the motor vehicle since it needs only be positioned on, for example, the rear end of the motor vehicle. Both the velocity-measuring device and the warning device are directed to the following vehicle in this case, and so no connecting lines into the driver's cab of the vehicle on which the apparatus is arranged need to be laid or are necessary. This is very advantageous, particularly in the case of trucks which may have trailers and/or semitrailers.

Here, the apparatus may consist of a plurality of different elements which, where necessary, may be positioned at different points on the motor vehicle. By way of example, it may be expedient to arrange the velocity-measuring device in the lower region of a motor vehicle rear end in order also to be able to identify approaching vehicles which have a relatively low height, for example automobiles or sports cars. Advantageously, the warning device may preferably be positioned in the upper region of the motor vehicle on which the apparatus is to be arranged in order, for example, to be able to emit an optical warning signal which is visible from afar. Moreover, the positioning in the upper region, for example on a rear end of a truck, is expedient if the driver of a following truck is intended to be warned.

Advantageously, the velocity-measuring device comprises at least one transmitter for emitting electromagnetic transmission radiation and at least two receivers for receiving transmission radiation reflected by the object. Electromagnetic transmission radiation is emitted in the direction of the object, i.e., preferably, a following vehicle, by way of the transmitter. Here, it is often sufficient to emit the emitted transmission radiation in a relatively large spatial region without it having to be specifically focused onto, for example, a following vehicle.

Objects on which electromagnetic transmission radiation is incident reflect at least some of this transmission radiation, which is subsequently received and recorded by the receivers of the velocity-measuring device. The velocity of the object relative to the velocity-measuring device, and hence relative to the apparatus and the motor vehicle on which it is arranged, may be determined in a manner known per se from the prior art by way of the emission of the electromagnetic radiation, which may be carried out in a pulsed or continuous manner. As a result of the reflected transmission radiation being recorded by at least two receivers, it is possible to determine not only the magnitude of the relative velocity but also the direction in which the object is situated on account of time-of-flight differences between two radiation pulses emitted in succession. Therefore, both the magnitude of the velocity and the direction of the velocity vector of the relative velocity may be determined from the results of a plurality of such measurements following one another in time.

By way of example, the warning criterion in this case may be selected in such a way that a warning signal is emitted if the relative velocity exceeds a predetermined threshold and the direction of the relative velocity is directed to the apparatus or passes the apparatus with only a relatively small spacing, for example of one to two meters. In this case, the assumption may be made that a collision of the object with the apparatus and the motor vehicle on which the latter is fastened is imminent should direction and magnitude of the relative velocity remain unchanged.

Advantageously, the transmission radiation is radar radiation.

An advantage of the apparatus comprising such a velocity-measuring device, independently of the type of emitted electromagnetic transmission radiation, lies in the fact that exactly one transmitter and exactly two receivers are required in a preferred configuration. A complicated setup with a plurality of transmitters is rendered unnecessary thereby, and so positioning and assembly of the apparatus on the motor vehicle, in particular at the rear end of a truck, is largely simplified and an incorrect fastening or alignment is avoided. As a result, the handling of the apparatus becomes very simple and the traffic safety is increased in a particularly reliable manner in this way.

In a preferred configuration, the apparatus comprises an acceleration-measuring device for determining a transverse acceleration and the electric controller of the apparatus is configured to ascertain a curve radius from a determined magnitude and direction of a relative velocity and a determined transverse acceleration, said curve radius likewise being used to check whether the warning criterion is satisfied. To this end, the relative velocity needs to be measured relative to a stationary object, for example a tree, sign or building, such that it corresponds to the entry velocity of the motor vehicle.

Here, the acceleration-measuring device is preferably positioned within or on the apparatus in such a way that it renders measurable accelerations which are substantially perpendicular to the expected direction of travel of the motor vehicle on which the apparatus is fastened. These accelerations occur if the motor vehicle on which the apparatus is fastened travels through a curve. The curve radius of the curve along which the motor vehicle travels may be determined from the occurred acceleration and a magnitude of the relative velocity, for example determined by the velocity-measuring device, relative to an object connected to the road in a stationary manner, for example a tree, sign or a guard rail. Naturally, this variable may also be used to check whether the warning criterion is satisfied. By way of example, the curve radius may be used to ascertain whether a collision is imminent if the present movement continues without change. A warning signal may be emitted if this is the case.

Preferably, the electric controller is configured to determine a change in the magnitude and/or direction of the relative velocity, which is likewise used to check whether the warning criterion is satisfied. From a plurality of instances of determining the magnitude and the direction of the relative velocity, carried out in succession, it is also possible to determine a change of these variables in the electric controller. These variables may also be used to determine the warning criterion and check whether the warning criterion has been satisfied.

It was found to be advantageous if the electric controller is configured to use an assumed maximum deceleration of the object and/or ascertained and/or assumed road conditions and/or an ascertained and/or assumed quality of the measurements and/or a certain object class for checking whether the warning criterion is satisfied. All these variables may improve the quality of a statement as to whether a collision appears to be imminent. By way of example, the greater the maximum deceleration of an object, for example a second motor vehicle or truck following the motor vehicle, the more likely the driver of this second motor vehicle is able to avoid a collision. This assumed maximum deceleration, which e.g. is stored as a fixed value in the electric controller or in a data memory to which the latter has access, may be made dependent on, for example, road conditions, which are ascertained or assumed. To this end, it is possible, for example, to at least approximately ascertain the road conditions on the basis of additional sensors, e.g. temperature and/or humidity. At low temperatures and high humidity, there is a risk of the road being icy or iced over, and so the maximum assumed deceleration of the following motor vehicle needs to be reduced. Moreover, it is possible, for example in the case of a velocity measurement by way of radar radiation as already described above, to determine whether it is raining on the basis of the received signal. This also influences the road conditions, and so these variables may also influence the maximum assumed deceleration of the respective following motor vehicle.

However, ascertaining or assuming road conditions is of interest not only for adapting an assumed value for the maximum deceleration of the following motor vehicle. Independently thereof, e.g. strong rain has a strong influence on the visibility conditions which may greatly deteriorate as a result of such precipitation or, for example, thick fog, as a result of which the collision probability increases in the case of otherwise unchanging parameters. Here, these parameters contain the aforementioned magnitude and direction of the relative velocity, the curve radius of the motor vehicle on which the apparatus is situated, a change in the relative velocity or any other variable which has already been mentioned.

The quality of the measurement results may also be included in the check as to whether the warning criterion is satisfied. By way of example, it is possible to take into account that a large number and a high density of metal parts is present in a tunnel, which metal parts, for example, may be present in the tunnel lining or in the form of guard rails. This has a significant interference signal as a consequence, particularly in the case of velocity measurement by way of electromagnetic radiation, and so the ascertained data would have to be provided with larger error values where necessary. As an alternative or in addition thereto, it is also possible to ascertain an object class of the object in respect of which the relative velocity is determined. By way of example, this may be brought about from a radiation signature of the received reflected radiation such that, for example, it is possible to distinguish between an approaching motorbike and an approaching truck. By way of example, this object class may influence the maximum deceleration of the object to be assumed and an avoidance probability. The avoidance probability, which may likewise have influence on checking the warning criterion, maps e.g. the capability of the object to perform the tightest possible cornering in a short period of time. This is necessary for evasive action, but the capability in this respect depends both on the object class and, for example, on the magnitude of the velocity of the object relative to the street, which may be ascertained from the inherent velocity of the apparatus and the relative velocity between the apparatus and the object.

Particularly when carrying out measurements using reflected electromagnetic radiation, the quality of the measurement may also be impaired by virtue of, for example, a multiplicity of vehicles being present on the respective traffic route on which the motor vehicle on which the apparatus is fastened also moves.

The course of the traffic route on which the vehicle and the following object are moving may be determined by way of periodically or continuously determined measurements of the curve radius of the motor vehicle on which the apparatus is situated and by continuously monitoring the direction of the relative velocity in relation to the following object and the change therein. This may naturally also be used in order, for example, to determine a collision probability or check in any other way whether the warning criterion is satisfied. By way of example, if the traffic route comprises a plurality of curves running in opposite directions, this has as a consequence for the direction of the relative velocity that the relative velocity passes e.g. on the left-hand side of the apparatus at one time and passes on the right-hand side of the apparatus at a later time. Between these two times, the direction of the relative velocity is directed directly onto the apparatus itself at a specific time, and so an increased collision probability would have to be assumed if only a snapshot in time is considered, even though this is not the case in reality. Consequently, the quality of the warning criterion may likewise be increased by storing the data ascertained from the velocity and the direction of the relative velocity and the inherently driven curve radius, and hence it is possible to reduce the number of incorrectly triggered warnings. Since these may be clear optical and/or acoustic warning signals, traffic safety may be increased by avoiding unnecessary warning signals.

Advantageously, the electric controller is configured to calculate a collision probability from all variables to be used within the scope of checks and to output a warning signal if the collision probability exceeds a predetermined threshold. As an alternative or in addition thereto, it is also possible to compare the variables used for checking with different regions for the respective variables, for example in tabular form, and to generate the warning criterion from the combination of the respective regions. By way of example, the warning criterion may be defined in such a way that a warning signal is triggered if the variable of the relative velocity exceeds a predetermined threshold and the direction of the relative velocity misses the apparatus by at most two meters, three meters or four meters. This is a relatively imprecise warning criterion since a snapshot of the direction of the relative velocity does not allow a reliable statement to be made about the question as to whether a warning signal should be emitted, especially in the case of winding traffic routes or cornering.

Advantageously, the apparatus comprises a position-measuring device for determining a position of the object from the apparatus, with the predetermined threshold depending on the position. Particularly preferably, the position-measuring device is part of the velocity-measuring device and/or the electric controller. Particularly in the case where the velocity-measuring device comprises a transmitter for emitting electromagnetic transmission radiation, it is possible, for example, for the receiver to determine how far the object, i.e., advantageously, a following motor vehicle, is away from the apparatus and hence from the motor vehicle on which the apparatus is fastened, for example from the time-of-flight of this electromagnetic transmission radiation from the emission by the transmitter to the reception by the receiver. By using two receivers, it is possible to determine the direction from which the reflected radiation comes, and so the position is ascertainable. Here, the predetermined threshold, at which the warning device for emitting the warning signal is activated, may advantageously depend on the position determined thus. If the determined distance between the apparatus and the object is relatively large, the predetermined threshold may advantageously also be selected to be relatively large since a relatively high relative velocity between the apparatus and the object is tolerable. The closer the object, i.e. a following vehicle, comes to the apparatus, the lower the predetermined threshold is advantageously also selected to be. The closer the object comes to the apparatus, the less time is available in road traffic for the driver of the following vehicle to react to changes in the driving behavior of the vehicle on which the apparatus is situated. Moreover, the probability of a rear-end collision is dependent not only on the relative velocity between the two vehicles but also on the distance between the two vehicles.

From the change in the direction from which the reflected signal originates, it is likewise possible to determine a direction of the relative velocity between the object and the apparatus. Emitting the warning signal only on the basis of the distance between the apparatus and the following object leads to a large number of unnecessary warning signals because, for example on the highway, an overtaking motor vehicle passes the apparatus with a very small distance and a relatively high relative speed, without a warning signal being necessary. It is therefore advantageous also to determine the direction of the movement of the object and hence also the direction of the relative velocity between the object and the apparatus and include the question as to whether a warning signal should be triggered in the check.

In a preferred configuration, the electric controller is also able to determine the absolute velocity of the apparatus and hence of the vehicle on which the apparatus is arranged. Thus, for example, electromagnetic transmission radiation emitted by a transmitter of the velocity-measuring device is not only reflected by the object, i.e. the following vehicle. Other objects, such as lane restriction guide poles, traffic signs or trees and/or buildings at the edge of the road also reflect some of the emitted transmission radiation, which may be received by the receiver of the velocity-measuring device. In this way, it is also possible to determine the relative velocity of the apparatus in relation to objects securely installed on the edge of the road, and so it is also possible to determine the absolute velocity of the motor vehicle on which the apparatus is situated without needing to resort to vehicle-internal electronic devices. The predetermined threshold may also be dependent on the absolute velocity of the apparatus determined thus. Here, as the apparatus slows down relative to the street, it is possible to select a higher predetermined threshold which the determined relative velocity between the apparatus and the object is not allowed to exceed. A rear-end collision with a given relative velocity has a lower damage potential at a relatively low absolute speed or, for example, at a standstill of the apparatus and hence of the motor vehicle on which the apparatus is fastened than the same rear-end collision with the same relative velocity in the case of a higher absolute velocity.

Advantageously, the determined position between the apparatus and the object is assigned to one of a plurality of regions, the predetermined threshold depending on the region, in particular said threshold being constant for positions in a region. Then, for example, the regions may comprise distances of less than 10 m, distances between 10 and 20 m, distances between 20 and 50 m and distances of greater than 50 m. The determined distance between the apparatus and the object is then sorted into the respective region. Here, the predetermined threshold is set differently for different determined distances. Naturally, other subdivisions of the different regions, for example into angular regions, are possible and optionally advantageous.

It was found to be advantageous if the warning device is embodied to emit an acoustic and/or optical warning signal and/or a radio signal, optionally with processing in the cockpit of a following vehicle. The use of radio signals is advantageous for "closed systems", in particular, which are distinguished by only a certain number of known vehicles moving in a closed region of traffic routes. An example would be a strip mine with diggers and trucks, in which no external vehicles are traveling. Advantageously, the type of warning signal is dependent on the determined relative velocity and/or the determined position, in particular the region. A dependence on the absolute velocity of the apparatus or the determined collision probability is also possible. Thus, it is conceivable, for example, to initially use an optical signal, for example flashing or lighting-up of an illuminating device, as a warning signal when the predetermined threshold is exceeded at a relatively large distance. The warning signals become more intense the closer the object approaches the apparatus. By way of example, this may be brought about by controlling the brightness of an optical warning signal or the color thereof and/or by controlling the volume and/or frequency of an acoustic warning signal. Preferably, it is also possible to combine different signals. The use of optical signals is advantageous in that uninvolved road users are not startled and/or distracted by suddenly activated acoustic warning installations. Moreover, optical signals may be output in a significantly more focused manner such that uninvolved road users are not disturbed and their concentration is not impaired.

Acoustic warning signals are advantageous in that they may be perceived even by inattentive or distracted drivers of the following vehicles, who would, possibly, not react, or react too late, to optical signals.

Advantageously, the apparatus comprises a plurality of warning devices. On the one hand, these may be warning devices for very different signal forms, for example acoustic or optical warning signals, but, on the other hand, warning devices for emitting the same type of warning signal may also be present multiple times. Thus, for example, it is advantageous to position a plurality of illuminating elements on the motor vehicle in order, for example, to be able to emit optical warning signals with different intensities, colors or brightness. The use of display elements, in which the warning signal is an optically lighting-up text message, for example the word "attention", is also possible.

Advantageously, the plurality of warning devices are fastenable to the motor vehicle at a distance from one another. Thus, it may be expedient, for example, to fasten different warning devices at different heights at the rear end of a motor vehicle. Here, for example, optical warning elements arranged in the upper region of a truck possibly may not be perceived by automobile drivers as they are situated outside of the usual field-of-view and the optical signals are transmitted above the following vehicle. Likewise, warning lamps arranged in the lower region of a rear end of a truck possibly may be perceived only to a limited extent by drivers of following trucks. In order to obtain the greatest amount of safety for all road users, it is therefore advantageous to fasten different warning devices at, for example, different positions in the motor vehicle.

It was found to be particularly advantageous that the apparatus only needs to be connected to a power supply of the motor vehicle. This is also possible in a particularly simple manner in the case of trucks with trailers and/or semitrailers since a power supply up to the rear end of each motor vehicle is present in any case. Additional connections, for example to the on-board electronics or for accessing vehicle-internal sensors, are not required. Likewise, there is no need to arrange any elements of the apparatus in the driver cabin of the motor vehicle, and so a connection in this direction is not required either. As a result, the outlay when assembling the apparatus is significantly reduced.

An electric controller within the meaning of the present invention is, in particular, an electronic data processing unit, for example a microchip, comprising all further components, such as e.g. lines, electronic data memory and communication apparatuses, which are required for facilitating the described functions.

To a certain extent, the self-orientation of the apparatus is possible by virtue of recorded and determined variables, in particular directions of relative velocity, being checked in respect of plausibility.

Below, an exemplary embodiment of the present invention is explained in more detail below with the aid of the drawing. In the drawing:

FIG. 1 shows the schematic illustration of an apparatus in accordance with a first exemplary embodiment of the present invention.

FIG. 1 shows the rear end of a motor vehicle 2 which, for example, may be a truck. A velocity-measuring device 4 is arranged centrally thereon. Two warning devices 6 are situated to the right and left of the velocity-measuring device 4, said warning devices, together with the velocity-measuring device 4 and an electronic controller (not depicted here), forming an apparatus 8 in accordance with one exemplary embodiment of the present invention.

The velocity-measuring device 4 comprises a transmitter (not depicted here) for emitting electromagnetic transmission radiation. It is emitted in a transmission region 10 which is spanned at the rear end of the motor vehicle 2 with a transmission-lobe shape. An object situated in the transmission region 10 reflects at least some of the emitted transmission radiation, said reflected portion being received by a receiver of the velocity-measuring device (likewise not depicted). In the shown exemplary embodiment, the electric controller is able to determine both the relative velocity of the apparatus 8 relative to the object and the distance between the apparatus 8 and the object. Here, the transmission region 10 is subdivided into four regions 12. If the determined relative velocity between the apparatus 8 and the object (not depicted here) exceeds a predetermined threshold, at least one of the warning devices 6 is activated and the latter transmits a warning signal in the direction of the object. Here, the predetermined threshold may depend on the region 12 in which the object is situated. In a preferred configuration of the apparatus 8 in accordance with one exemplary embodiment of the present invention, it is possible, for example, for the electric controller also to determine an orientation of e.g. the transmitter of the velocity-measuring device relative to the motor vehicle 2 or relative to the object, in particular by tracking the movement of the object. By way of example, if the apparatus 8 is not aligned exactly toward the back on the motor vehicle, certain angle deviations may be compensated for in a manner known in principle from the prior art.

LIST OF REFERENCE SIGNS

2 Motor vehicle
4 Velocity-measuring device
6 Warning device
8 Apparatus
10 Transmission region
12 Region

The invention claimed is:

1. An apparatus to be arranged on a motor vehicle, comprising:
   a velocity-measuring device for determining magnitude and direction of a relative velocity between an object and the apparatus, wherein the velocity-measuring device comprises at least one transmitter for emitting electromagnetic transmission radiation and at least two receivers for receiving transmission radiation reflected by the object,
   at least one warning device for emitting a warning signal in a direction of the object,
   an electric controller configured to check whether a predetermined warning criterion is satisfied based on the determined magnitude and direction of the relative velocity, wherein the electric controller causes the emission of the warning signal by the at least one warning device, and an acceleration-measuring device for determining a transverse acceleration, wherein the electric controller is configured to ascertain a curve radius from the determined magnitude and direction of the relative velocity and the determined transverse acceleration, wherein the curve radius is used to check whether the predetermined warning criterion is satisfied, and wherein the electric controller is configured to use an ascertained quality of measurements and distinguishes object class for checking whether the predetermined warning criterion is satisfied.

2. The apparatus as claimed in claim 1, wherein the electric controller is configured to determine a change in the determined magnitude and direction of the relative velocity, wherein the change in the determined magnitude and direction of the relative velocity is used to check whether the warning criterion is satisfied.

3. The apparatus as claimed in claim 1 wherein the electric controller is further configured to use one or more of an assumed maximum deceleration of the object, ascertained road conditions, assumed road conditions assumed quality of measurements, and a certain object class for checking whether the warning criterion is satisfied.

4. The apparatus as claimed in claim 1 wherein the electric controller is configured to calculate a collision probability from all variables used within a scope of checks and to output a warning signal if the collision probability exceeds a predetermined threshold.

5. The apparatus as claimed in claim 4, further comprising a position-measuring device for determining a position of the object relative to the apparatus and wherein the predetermined threshold depends on the position.

6. The apparatus as claimed in claim 5, wherein the determined position is assigned to one of a plurality of regions and the predetermined threshold depends on the one of a plurality of regions to which the determined position is assigned.

7. The apparatus as claimed in claim 1 wherein the at least one warning device emits one or more of an acoustic warning signal and an optical warning signal.

8. The apparatus as claimed in claim 7, wherein a type of warning signal emitted by the at least one warning device depends on one or more of the determined relative velocity and the determined position.

9. The apparatus as claimed in claim 1 wherein the at least one warning device includes a plurality of warning devices.

10. The apparatus as claimed in claim 9, wherein at least some of the plurality of warning devices are fastenable to the motor vehicle at a distance from one another.

11. The apparatus as claimed in claim 1 further comprising a connector for connection to a power supply of the motor vehicle.

12. The apparatus of claim 6 the threshold is constant for all positions in any one region of the plurality of regions.

13. The apparatus as claimed in claim 7, wherein a type of warning signal emitted by the at least one warning device depends on an assigned region.

* * * * *